United States Patent
Bandic et al.

(10) Patent No.: US 7,160,477 B2
(45) Date of Patent: Jan. 9, 2007

(54) METHOD FOR MAKING A CONTACT MAGNETIC TRANSFER TEMPLATE

(75) Inventors: Zvonimir Z. Bandic, San Jose, CA (US); A. David Erpelding, San Jose, CA (US); Jordan Asher Katine, San Jose, CA (US); Quang Le, San Jose, CA (US); Kim Y. Lee, Fremont, CA (US); Jui-Lung Li, San Jose, CA (US); Michael J. Rooks, Briarcliff Manor, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 114 days.

(21) Appl. No.: 11/044,288

(22) Filed: Jan. 26, 2005

(65) Prior Publication Data

US 2006/0163195 A1    Jul. 27, 2006

(51) Int. Cl.
    *B44C 1/22* (2006.01)
(52) U.S. Cl. .................. 216/22; 216/88; 438/692; 438/740; 29/603.06; 29/603.07
(58) Field of Classification Search ............... 216/22, 216/88; 438/692, 740; 29/603.06, 603.07
See application file for complete search history.

(56) References Cited

U.S. PATENT DOCUMENTS

| 6,264,848 B1 * | 7/2001 | Belser et al. ............... 216/22 |
| 6,347,016 B1 | 2/2002 | Ishida et al. |
| 6,433,944 B1 | 8/2002 | Nagao et al. |
| 6,788,641 B1 * | 9/2004 | Belser et al. ............. 369/275.2 |
| 6,798,590 B1 | 9/2004 | Albrecht et al. |
| 2003/0022023 A1 | 1/2003 | Carey et al. |
| 2004/0038077 A1 | 2/2004 | Nagao et al. |

FOREIGN PATENT DOCUMENTS

JP    2002-342921    11/2002

OTHER PUBLICATIONS

Ishida, T. et al., "Magnetic Printing Technology-Application to HDD", IEEE Transactions on Magnetics, vol. 39, No. 2, Mar. 2003, pp. 628-632.

* cited by examiner

*Primary Examiner*—Shamim Ahmed
(74) *Attorney, Agent, or Firm*—Thomas R. Berthold

(57) ABSTRACT

A contact magnetic transfer (CMT) master template is made by first adhering a plastic film to a first surface of a silicon wafer. A resist pattern is then formed on the polyimide film and the polyimide is reactive-ion-etched through the resist to form recesses. The resist is removed and a chemical-mechanical-polishing (CMP) stop layer is deposited over the non-recessed regions of the polyimide, and optionally into the bottoms of the recesses. A layer of magnetic material is then deposited over the polyimide film to fill the recesses. A CMP process is then performed to remove magnetic material above the recesses and above the non-recessed regions and continued until the CMP stop layer is reached. The resulting upper surface of the polyimide film is then a continuous planar film of magnetic islands and regions of CMP stop layer material that function as the nonmagnetic regions of the template.

40 Claims, 6 Drawing Sheets

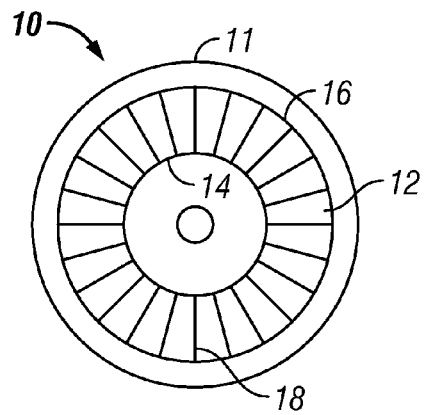
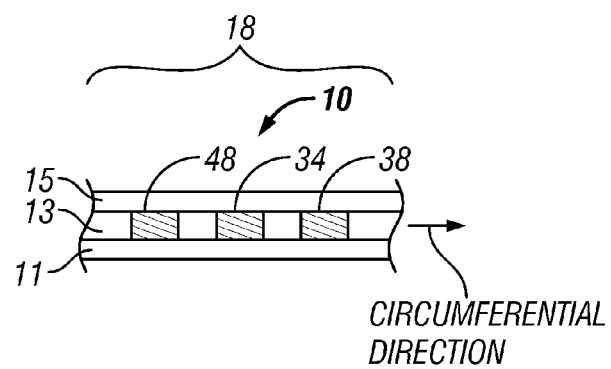
FIG. 1A
FIG. 1B
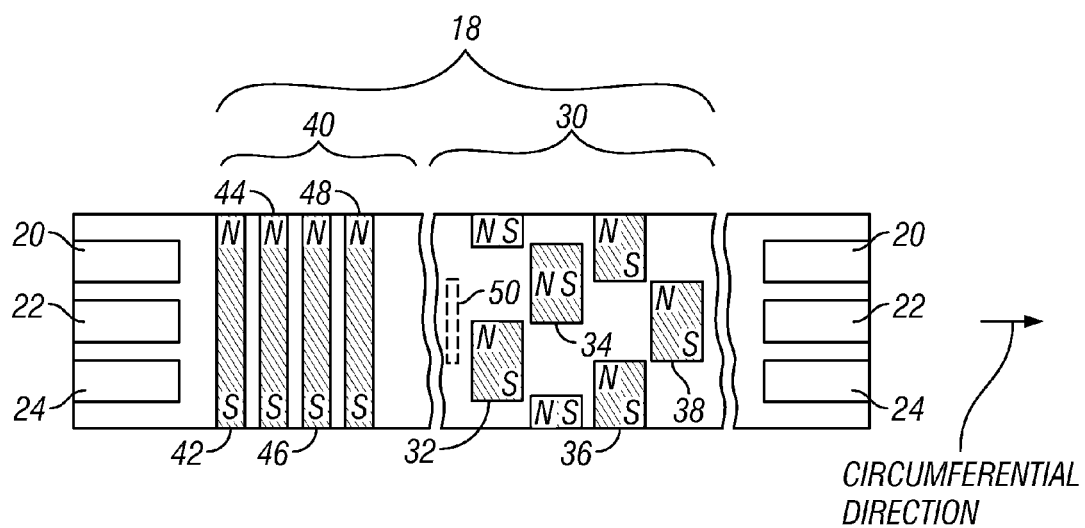
FIG. 2

METHOD FOR MAKING A CONTACT MAGNETIC TRANSFER TEMPLATE

RELATED APPLICATION

This application is related to concurrently filed application Ser. No. 11/044,777 filed Jan. 26, 2005 and titled "CONTACT MAGNETIC TRANSFER TEMPLATE".

BACKGROUND OF THE INVENTION

1. Field of the Invention

This invention relates generally to a master template for contact magnetic transfer of magnetic patterns and to a method for making the template.

2. Description of the Related Art

Contact magnetic duplication or transfer (CMT), sometimes referred to as magnetic printing, is a method of instantaneous recording of magnetic patterns onto magnetic media. In a magnetic recording hard disk drive, each disk contains a fixed, pre-recorded servo pattern of magnetized servo regions or blocks that are used to position the recording head to the desired data track. In the CMT method for forming the servo pattern a "master" disk or template is used that contains regions or islands of soft (low-coercivity) magnetic material in a pattern corresponding to the servo pattern that is to be transferred to the magnetic recording disk (the "slave" disk).

The CMT master template is typically a rigid substrate or a rigid substrate with a plastic film formed on it. These types of master templates have been described in U.S. Pat. Nos. 6,347,016 B1 and 6,433,944 B1; Japanese published application JP2002-342921; and by Ishida, T. et al., "Magnetic Printing Technology-Application to HDD", *IEEE Transactions on Magnetics*, Vol 39, No. 2, March 2003, pp 628–632.

In U.S. Pat. No. 6,798,590 B2, assigned to the same assignee as this application, a CMT method is described that uses a flexible master template and a differential gas pressure to press the pattern of magnetic islands against the slave disk. The pattern of magnetic islands is formed on the template by electroplating or evaporation of the magnetic material through a resist pattern, followed by liftoff of the resist. However, this process can result in variations in the surfaces of the magnetic islands and irregularities in the shape of the magnetic islands.

What is needed is an improved CMT master template and method for making it.

SUMMARY OF THE INVENTION

The invention is a method for making a CMT master template. The template has a flexible plastic film with a planarized top or upper surface containing magnetic islands separated from one another by nonmagnetic regions. The flexible plastic film is secured at its perimeter to a silicon annulus that provides rigid support at the perimeter of the film. The plastic film is preferably polyimide that has recesses filled with the magnetic material that form the pattern of magnetic islands. The upper surfaces of the islands and the upper surfaces of the nonmagnetic regions form a continuous planar surface.

The template is made by first adhering the plastic film to a first surface of a silicon wafer, such as by spin-coating liquid polyimide followed by curing. A resist pattern is then formed on the polyimide film and the polyimide is reactive-ion-etched through the resist to form recesses. The resist is removed and a chemical-mechanical-polishing (CMP) stop layer is deposited over the non-recessed regions of the polyimide, and optionally into the bottoms of the recesses. A layer of magnetic material is then deposited over the polyimide film to fill the recesses. A CMP process is then performed to remove magnetic material above the recesses and above the non-recessed regions and continued until the CMP stop layer is reached. The resulting upper surface of the polyimide film is then a continuous planar film of magnetic islands and regions of CMP stop layer material that function as the nonmagnetic regions. The central portion of the silicon beneath the polyimide film is then removed to leave just the annular silicon portion supporting the polyimide film at its perimeter. The preferred removal process for the silicon is to wet etch the silicon wafer from its second surface. A barrier layer may be deposited on the first surface of the silicon wafer prior to the polyimide film. When the central portion of the silicon wafer is removed by wet etching from its second surface the wet etching is terminated when the barrier layer is reached so that the polyimide film is not attacked by the etchant. If the silicon substrate is removed in this manner, then the resulting master template has the barrier layer remaining on its bottom or lower surface.

For a fuller understanding of the nature and advantages of the present invention, reference should be made to the following detailed description taken together with the accompanying figures.

BRIEF DESCRIPTION OF THE DRAWINGS

FIGS. 1A–1B are a plan view and a partial sectional view, respectively, of a hard magnetic recording disk illustrating a pattern of servo sectors extending generally radially across an annular data band.

FIG. 2 is an expanded view of one of the servo sectors of FIG. 1A showing the magnetized servo regions or blocks.

DETAILED DESCRIPTION OF THE INVENTION

Figure 3:
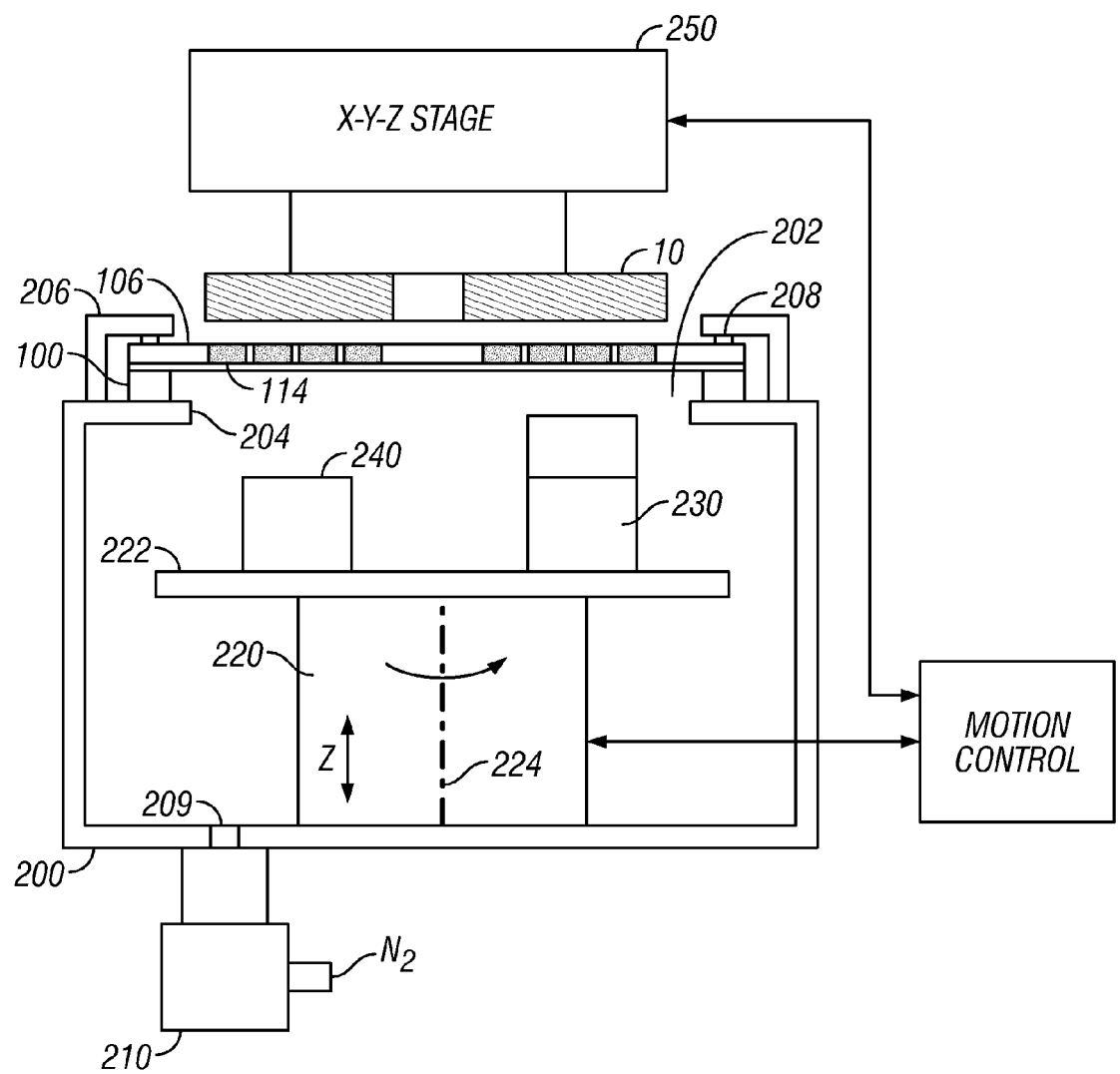
FIG. 3 is a side sectional view of the CMT apparatus used with the CMT master template made according to the method of the present invention.

A typical example of a rigid magnetic recording disk with a servo pattern formed by contact magnetic transfer (CMT) is shown in the plan view FIG. 1A and the sectional view FIG. 1B. The magnetic recording disk 10 comprises a rigid substrate 11, a thin film metal alloy (e.g., CoPtCrB) magnetic recording layer 13 on the substrate and an outer layer 15 (e.g., a protective amorphous carbon overcoat, which typically has a lubricant, such as perfluoropolyether (PFPE), on its surface). The disk 10 has an annular data portion or band 12 which is defined by an inside diameter (ID) 14 and an outside diameter (OD) 16. The sectional view of FIG. 1B is taken along the track or circumferential direction and shows substrate 11, recording layer 13 with typical magnetized portions 48, 34, 38 making up part of the servo pattern, and outer layer 15. During operation of the disk drive, the head reads or writes data on a selected one of a number of concentric data tracks located between the ID 14 and OD 16 of the annular data band 12. To accurately read or write data from a selected track, the head is required to be maintained over the centerline of the track. Accordingly, each time one of the servo sectors, such as typical sector 18, passes beneath the head, the disk drive's head positioning control system receives servo information from the servo blocks contained within the servo sector. The information contained in the servo blocks generates a position error signal which is used by the head positioning control system to move the head towards the track centerline. Thus, during a complete rotation of the disk 10, the head is continually maintained over the track centerline by servo information from the servo blocks in successive servo sectors.

An expanded top view of a typical servo sector 18 and portions of three data tracks is shown in FIG. 2. The three data tracks 20, 22, 24 are shown in outline. All of the shaded portions of FIG. 2 represent magnetized regions of the recording layer 13 that have been patterned by a CMT process. The "N" and "S" indicate the poles for each magnetized region. The non-shaded portions on FIG. 2 represent the regions of recording layer 13 that retain their magnetization from a DC magnetization process prior to the CMT process. A portion of the servo sector 18 is a servo field 30 that includes spaced-apart servo blocks, such as typical servo blocks 32, 34 and 36, 38. Also included in servo sector 18 is a field 40 of radial stripes 42, 44, 46, 48 that are used to provide synchronization and gain control for the subsequently read servo signals from servo blocks 32, 34 and 36, 38. Additional information, e.g., timing marks indicating the beginning of a servo sector and/or a coded pattern for identifying the specific servo track by track number, may also be included in servo sector 18. The servo blocks 32, 34 and 36, 38 in servo field 30 and the radial stripes 42–48 in the synchronization/gain field 40 are DC magnetized in the track or circumferential direction of the disk, as indicated by the designations "N" and "S" in FIG. 2.

The CMT master template made according to the method of the present invention is shown as it would be used in the CMT apparatus of FIG. 3, which is the CMT apparatus also described in the previously-cited co-pending application. A chamber 200 has an upper opening 202 with an outer periphery 204. The opening 202 is covered by the CMT master template. The CMT master template comprises a flexible plastic film 106 supported at its outer perimeter by a rigid substrate 100. The plastic film 106 has a pattern of magnetic islands 114 corresponding to the pattern to be transferred to the slave disk. The chamber opening 202 is sealed by clamp 206 and O-ring 208. The interior of chamber 200 has an inlet 209 connected to pressure regulator 210 which is connected to a pressurized nitrogen source. A rotation stage 220 is located inside chamber 200 and supports a platform 222 that rotates about an axis 224. A permanent magnet 230 and a counterweight 240 for magnet 230 are mounted off-axis on the platform 222. The stage 220 is also movable in the vertical Z-direction parallel to the axis 224 so that magnet 230 can be positioned at the desired distance from plastic film 106. The recording disk 10 to be patterned (the slave disk) is mounted on a gripper arm 250 that is movable in the X-Y-Z directions above the plastic film 106. The movement of the gripper arm 250 and stage 220 is controlled by a motion controller, typically a PC. The chamber 200 is pressurized to move the plastic film 106 with its pattern of magnetic islands 114 into contact with the slave disk 10. As the stage 220 rotates, the magnetic field from magnet 230 creates a magnetized pattern in slave disk 10 that replicates the pattern of magnetic islands 114 on the plastic film 106 of the CMT master template.

Figure 4A:
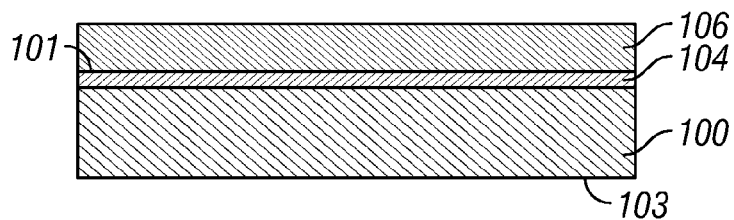
FIGS. 4A–4K are sectional views showing the steps in a first embodiment of the method for making the CMT master template of the present invention.

A first method for making the CMT master template will be described with FIGS. 4A–4K, which are sectional views not to scale so that the features of the template can be seen. In FIG. 4A a rigid support structure or substrate 100 has a plastic film 106 adhered to it. The substrate 100 is preferably semiconductor-grade single-crystal silicon with a first or top surface 101 that supports the plastic film 106 and a second or bottom surface 103. The silicon substrate can be any commercially available Si wafer, such as a 5 in. Si wafer 550 µm thick. The plastic film 106 is preferably polyimide having a thickness in the range of approximately 5 to 25 µm. It can be adhered directly to the silicon surface 101 by applying a liquid polyimide, such as by spin-coating, followed by curing. Some of the liquid polyimide types-used are Hitachi-DuPont Microsystems 2610, 2611 and 5811. The plastic film 106 can also be adhered to the silicon surface 101 in sheet form with a suitable adhesive. Commercially available plastic sheets can be polyethylene terephtalate (PET), naphtalate (PEN) or polyimide, such as Melinex 453, Melinex 725, Melinex 561, Mylar D1, and Kadanex 1000, all available from DuPont. Also shown in FIG. 4A is an optional barrier layer 104. Barrier layer 104 is applied to the silicon surface 101 before the plastic film 106 if the silicon substrate 100 is intended to be later removed by a wet etching process that might attack the plastic film 106. If the plastic film 106 is polyimide, then the optional barrier layer 104 can be a material such as chromium (Cr) or gold (Au) that is sputter deposited or evaporated to a thickness in the range of approximately 10 to 30 nm on the silicon substrate surface 101.

Figure 4B:
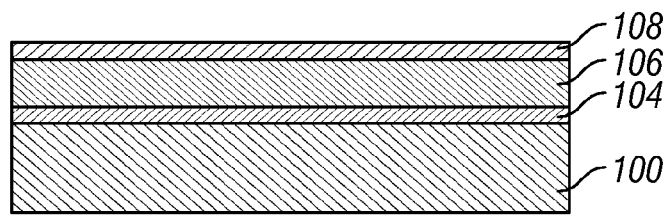

In FIG. 4B an optional etch-protect layer 108 is deposited on top of the plastic film 106. Etch-protect layer 108 improves the surface smoothness of the plastic film 106 that is not intended to be etched. The preferred material for etch-protect layer 108 is germanium (Ge) sputter deposited or evaporated to a thickness in the range of approximately 10–20 nm. Other materials for etch-protect layer 108 are chromium (Cr), tantalum (Ta) and tungsten (W).

Figure 4C:
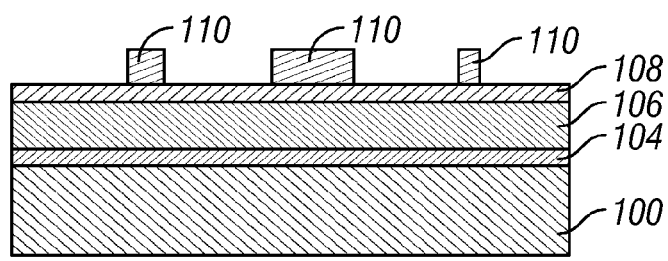

In FIG. 4C a pattern of resist 110 has been formed on the plastic film 106 or on the etch-protect layer 108 if it is used. The resist may be an electron-beam (e-beam) resist such as polymethylmethacrylate (PMMA) that is applied by spin-coating and then cured. The e-beam resist film is then exposed to the e-beam in an e-beam lithography tool in the pattern desired for the CMT master template. The resist is then developed and removed, leaving the pattern of resist 110.

Figure 4D:
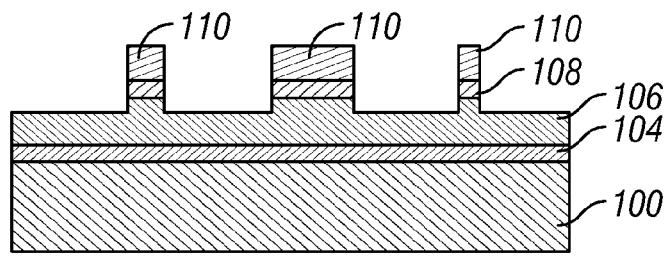

In FIG. 4D the plastic film 106 is etched through the pattern of resist 110 to form recesses in the plastic film 106. If a Ge etch-protect layer 108 is used then the Ge is etched by reactive-ion-etching (RIE) in a $CHF_3$ gas to remove the Ge layer. This is followed by RIE of the plastic film 106 in an oxygen/argon ($O_2$/Ar) atmosphere. The RIE continues until approximately 50 nm of the plastic film 106 has been removed. Because the $O_2$ also attacks the resist, the surface of the plastic film 106 in the non-recessed regions beneath the resist 110 may become roughened by the RIE if the etch-protect layer 108 was not present between the non-recessed plastic film 106 regions and the resist 110. Thus the optional etch-protect layer 108 improves the surface smoothness of the plastic film 106 in the non-recessed regions.

Figure 4E:
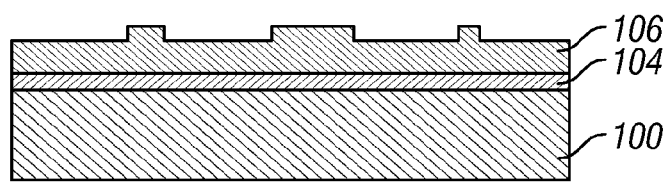

In FIG. 4E, the resist 110 and etch-protect layer 108 have been removed. The resist is removed by conventional solvents such as acetone or N-Methylpyrrolidone (NMP). If the etch-protect layer 108 is Ge it is removed by application of hydrogen peroxide ($H_2O_2$), such as by dipping into the $H_2O_2$ for approximately 10 to 15 seconds.

Figure 4F:
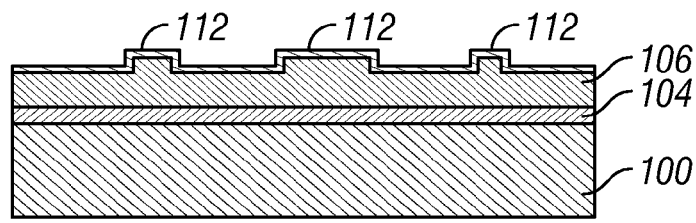

In FIG. 4F, a chemical-mechanical-polishing (CMP) stop layer 112 is deposited over the entire plastic film 106. The CMP stop layer 112 is a material substantially resistant to the CMP process so that the CMP process that removes material above the CMP stop layer essentially ends when the stop layer is reached. In this first embodiment of the method, the CMP stop layer 112 is deposited not only over the non-recessed regions of the plastic film 106, but also into the recesses in the plastic film 106. The preferred materials for CMP stop layer 112 are diamond-like carbon (DLC) formed by ion-beam-deposition (IBD) to a thickness in the range of approximately 10 to 50 nm and tantalum (Ta) sputter deposited to a thickness in the range of approximately 20 to 100 nm. Other known CMP stop layer materials include one or more nitrides of Ta (TaNx) and titanium (TiNx), as well as Cr and NiCr alloy.

Figure 4G:
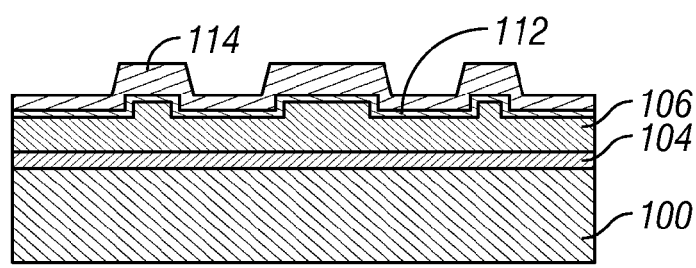

In FIG. 4G, the magnetic material layer 114 is deposited over the CMP stop layer 112 to fill the recesses in the plastic film 106. The magnetic material is any soft (relatively low coercivity) magnetic material, such as NiFe(30/70) or NiFe (55/45) or NiFe(80/20) or NiFeCo(35/12/53) or FeCo(62/38) or other alloys of Ni, Fe and/or Co. The magnetic material layer 114 can be deposited by evaporation or electroplating or other known processes, but the preferred process is by IBD. The magnetic material layer 114 is deposited to a thickness in the range of approximately 100 to 300 nm.

Figure 4H:
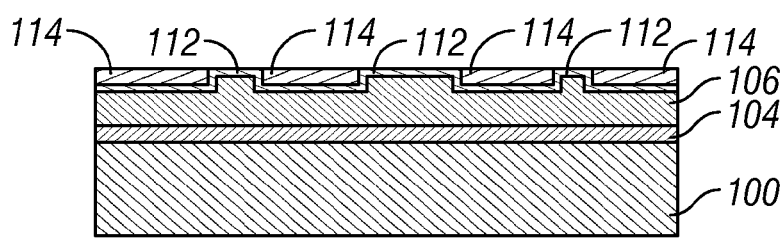

Next the CMP is performed until the CMP stop layer 112 in the non-recessed regions of the plastic film 106 is reached. This removes the magnetic material above the CMP stop layer 112 in the non-recessed regions and a portion of the magnetic material above the recessed regions, but leaves the magnetic material in the recesses of the plastic film 106. The CMP process can use any slurry known to remove the magnetic material. The preferred CMP slurry for a NiFe magnetic material is a KOH or $NH_4OH$ based slurry with colloidal silica particles with an average particle size of between approximately 20 and 200 nm, such as a Klebosol® slurry product manufactured by Clariant. As shown in FIG. 4H, after the CMP process, the surface above the plastic film 106 has been planarized and includes the magnetic islands 114 separated by nonmagnetic regions of the CMP stop layer 112.

Figure 5:
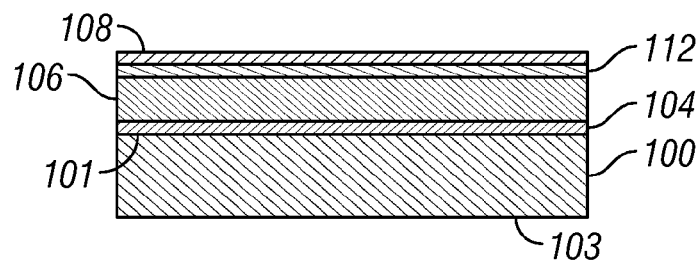
FIGS. 5, 6, 7, 8, and 9 are sectional views showing the steps in a second embodiment of the method for making the CMT master template for comparison with corresponding FIGS. 4B, 4C, 4D, 4G and 4H.
Figure 6:
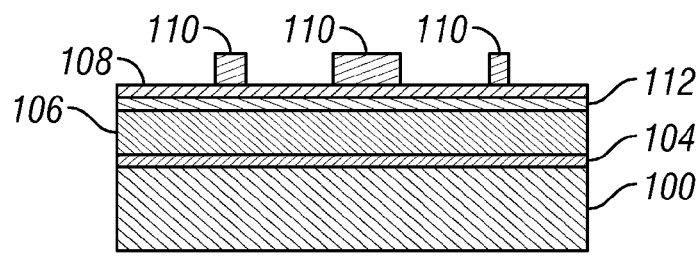
Figure 7:
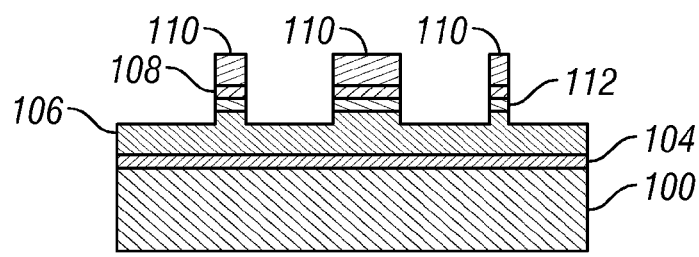
Figure 8:
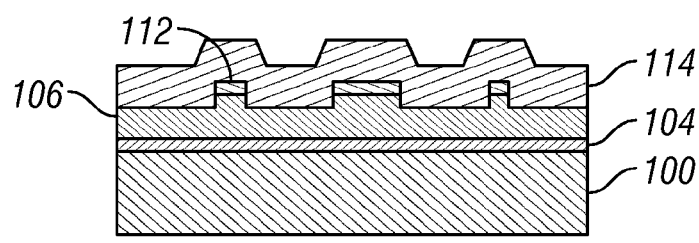
Figure 9:
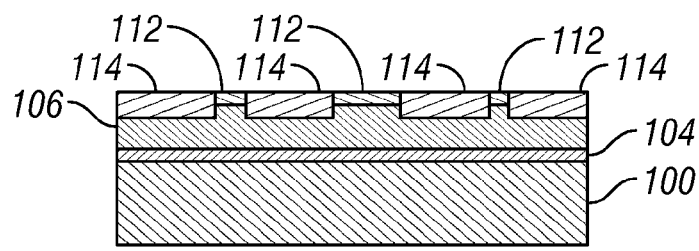

A second embodiment of the method is shown in FIGS. 5, 6, 7, 8, and 9 for comparison with corresponding FIGS. 4B, 4C, 4D, 4G and 4H of the first embodiment of the process. The primary difference is that in the second embodiment the CMP stop layer 112 is deposited on the plastic film 106 before the Ge etch-protect layer 108, as shown in FIG. 5. The formation of the pattern of resist 110 (FIG. 6) is the same as in FIG. 4C. The RIE (FIG. 7) is the same as in FIG. 4D, except that following the RIE there is no CMP stop layer located in the bottom of the recesses or the walls of the recesses. After removal of the resist 110 and the Ge etch-protect layer 108 the magnetic material layer 114 is deposited into the recesses and is now in direct contact with the plastic film 106 (FIG. 8), instead of in contact with the CMP stop layer 112 (FIG. 4G). After CMP the magnetic islands and CMP stop layer regions are planarized with only magnetic material being located in the recesses (FIG. 9), unlike in FIG. 4H where CMP stop layer material is located in the recesses as well as in the side walls of the recesses. The absence of CMP stop layer material in the recesses and side walls enables the magnetic islands to be more precisely dimensioned.

Figure 4I:
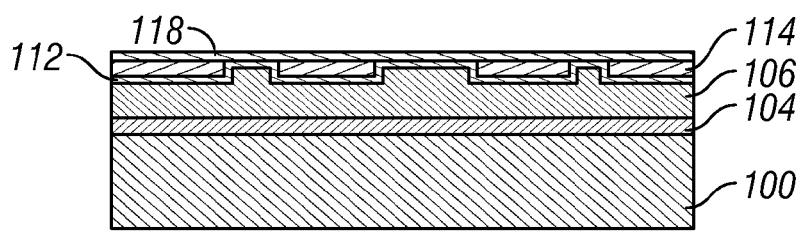

In both embodiments of the method, after planarization by CMP, a thin protective film 118 is deposited, as shown in FIG. 4I. The protective film 118 may be a sputter deposited carbon film approximately 2 to 5 nm thick. Other materials for protective film 118 include SiNx (silicon nitride). In addition to or in place of the protective film 118, a plasma-polymerized 4 nm thick perfluorocarbon (PFC) overcoat can be applied. The protective film 118 and PFC overcoat improve the durability and reduce water contamination of the master template.

Figure 4J:
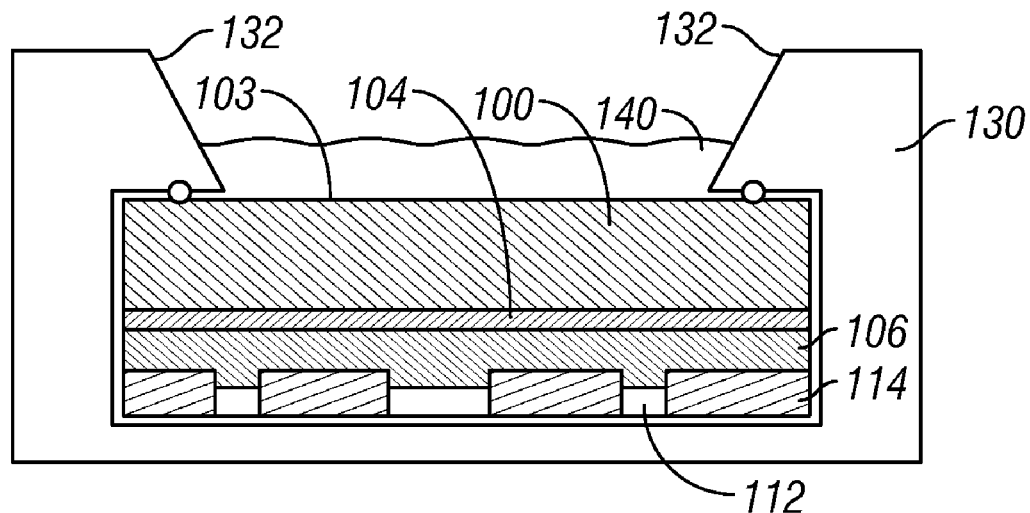

After deposition of the protective film 118 and/or PFC overcoat, the upper surface of the CMT master template is complete. The remaining step is to remove the plastic film 106 from the surface 101 of the silicon substrate 100. If the plastic film 106 is a plastic sheet adhered to the silicon by an adhesive it is removed by simply peeling it off. However, if a liquid was applied to the silicon and then cured to form the plastic film 106, such as the polyimide film, then the preferred method to remove it is to wet etch the silicon from the back surface 103. As shown in FIG. 4J, in this method the silicon substrate 100 is placed in a cylindrical fixture 130 that has a wall 132. The second or bottom surface 103 of silicon substrate 100 and the wall 132 form a sealed container for the wet etchant, with the seal provided by an O-ring 134. The wet etchant 140 is placed into the container 130 and removes the silicon from the back surface 103. The wet etching continues until all of the silicon has been removed in the area exposed to the etchant. One type of wet etchant for silicon is a mixture of hydrofluoric acid (HF) and nitric acid ($HNO_3$). If the optional barrier layer 104 has been formed between the first surface 101 and the plastic film 106 then the barrier layer 104 is resistant to the wet etchant so that the etching stops when the barrier layer 104 has been reached. If the etchant is the solution of HF and $HNO_3$, the preferred barrier layer 104 is a Cr film approximately 200 to 500 nm thick.

Figure 4K:
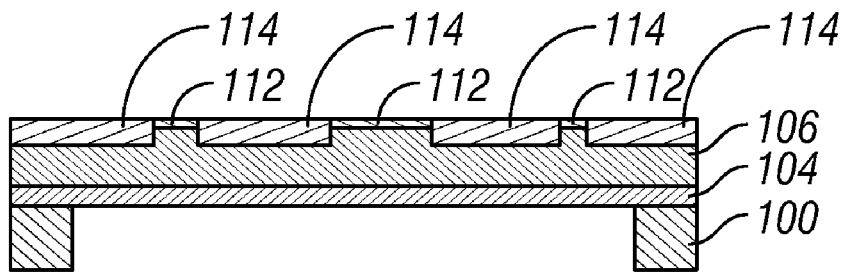

After removal of the plastic film 106, the CMT master template is as shown in FIG. 4K, and comprises the flexible plastic film 106 attached at its outer perimeter to a rigid annular support 100 with its top surface being the planarized magnetic islands 114 and stop layer regions 112 and its bottom surface being the barrier layer 104.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a flexible contact magnetic transfer template comprising:
   providing a silicon substrate having first and second generally planar surfaces;
   adhering a plastic film to the first surface of the substrate;
   depositing a chemical-mechanical-polishing (CMP) stop layer on the plastic film;
   forming a pattern of resist on the CMP stop layer;
   etching the plastic film through the resist pattern to form recesses in the plastic film;
   removing the resist;
   depositing a layer of magnetic material over the CMP stop layer and into the recesses in the plastic film;
   removing the magnetic material by CMP until the CMP stop layer is reached; and
   removing the silicon substrate from the plastic film.

2. The method of claim 1 wherein adhering a plastic film comprises coating the first surface of the silicon substrate with liquid polyimide and curing the polyimide.

3. The method of claim 1 wherein forming a pattern of resist on the CMP stop layer comprises depositing a layer of e-beam resist, exposing the e-beam resist layer using an e-beam lithographic tool, and developing the exposed e-beam resist.

4. The method of claim 1 wherein etching the plastic film comprises reactive-ion-etching the plastic film in an oxygen/argon atmosphere.

5. The method of claim 1 wherein depositing a CMP stop layer comprises depositing a layer of material selected from the group consisting of diamond-like carbon (DLC), Ta, one or more nitrides of Ta, one or more nitrides of Ti, Cr and NiCr alloy.

6. The method of claim 1 wherein depositing a layer of magnetic material comprises depositing a layer of an alloy of one or more of Ni, Fe and Co.

7. The method of claim 1 wherein removing the magnetic material by CMP comprises using a KOH or $NH_4OH$ based CMP slurry with colloidal silica particles having an average particle size of between approximately 20 and 200 nm.

8. The method of claim 1 wherein removing the silicon substrate from the plastic film comprises wet-etching the silicon substrate from its second surface.

9. The method of claim 1 wherein wet-etching the silicon substrate comprises etching with a mixture of HF and $HNO_3$.

10. The method of claim 8 further comprising depositing a barrier layer on the first surface of the silicon substrate prior to adhering the plastic film, the barrier layer being formed of a material resistant to the wet etchant.

11. The method of claim 10 wherein the barrier layer is a material selected from the group consisting of Cr and Au.

12. The method of claim 1 further comprising depositing an etch-protect layer on the CMP stop layer prior to forming the pattern of resist.

13. The method of claim 12 wherein the etch-protect layer is a material selected from the group consisting of Ge, Cr, Ta and W.

14. The method of claim 12 further comprising etching the etch-protect layer through the resist pattern to remove the etch-protect layer prior to etching the plastic film.

15. The method of claim 14 wherein the etch-protect layer is Ge and wherein etching the etch-protect layer comprises reactive-ion-etching the Ge in an $CHF_3$ gas.

16. The method of claim 12 further comprising removing the etch-protect layer from beneath the resist after removing the resist.

17. The method of claim 16 wherein the etch-protect layer is Ge and wherein removing the Ge from beneath the resist comprises removing the Ge with hydrogen peroxide.

18. The method of claim 1 further comprising depositing an etch-protect layer on the CMP stop layer before forming the pattern of resist.

19. The method of claim 18 further comprising etching the etch-protect layer and the CMP stop layer through the resist pattern to remove the etch-protect layer and CMP stop layer prior to etching the plastic film.

20. The method of claim 19 wherein the etch-protect layer is Ge and wherein etching the etch-protect layer comprises reactive-ion-etching the Ge in $CHF_3$ gas.

21. The method of claim 1 further comprising depositing a protective film over the CMP stop layer after removing the magnetic material by CMP.

22. The method of claim 1 further comprising depositing a perfluorocarbon coating over the protective film.

23. A method for making a flexible contact magnetic transfer template comprising:

providing a silicon substrate having first and second generally planar surfaces;

depositing a barrier layer on the first surface of the silicon substrate, the barrier layer being formed of a material resistant to a wet etchant capable of etching silicon;

adhering a polyimide film to the barrier layer by coating the barrier layer with liquid polyimide and curing the polyimide;

forming a pattern of resist on the polyimide film;

etching the polyimide film through the resist pattern to form recesses in the polyimide film;

removing the resist;

after etching the polyimide film and removing the resist, depositing a chemical-mechanical-polishing (CMP) stop layer on the polyimide film and into the recesses in the polyimide film;

depositing a layer of magnetic material over the CMP stop layer and into the recesses in the polyimide film;

removing the magnetic material by CMP until the CMP stop layer is reached; and removing the silicon substrate from the polyimide film by wet-etching the silicon substrate from its second surface until substantially all the silicon in contact with the baffier layer has been removed.

24. The method of claim 23 wherein forming a pattern of resist on the polyimide film comprises depositing a layer of e-beam resist, exposing the e-beam resist layer using an e-beam lithographic tool, and developing the exposed e-beam resist.

25. The method of claim 23 wherein etching the polyimide film comprises reactive-ion-etching the polyimide film in an oxygen/argon atmosphere.

26. The method of claim 23 wherein depositing a CMP stop layer comprises depositing a layer of material selected from the group consisting of diamond-like carbon (DLC), Ta, one or more nitrides of Ta, one or more nitrides of Ti, Cr and Ni Cr alloy.

27. The method of claim 23 wherein depositing a layer of magnetic material comprises depositing a layer of an alloy of one or more of Ni, Fe and Co.

28. The method of claim 23 wherein removing the magnetic material by CMP comprises using a KOH or $NH_4OH$ based CMP slurry with colloidal silica particles having an average particle size of between approximately 20 and 200 nm.

29. The method of claim 23 wherein wet-etching the silicon substrate comprises etching with a mixture of HF and $HNO_3$.

30. The method of claim 23 wherein the barrier layer is a material selected from the group consisting of Cr and Au.

31. The method of claim 23 further comprising depositing an etch-protect layer on the polyimide film prior to forming the pattern of resist.

32. The method of claim 31 wherein the etch-protect layer is a material selected from the group consisting of Ge, Ta, Cr and W.

33. The method of claim 31 further comprising etching the etch-protect layer through the resist pattern to remove the etch-protect layer prior to etching the polyimide film.

34. The method of claim 33 wherein the etch-protect layer is Ge and wherein etching the etch-protect layer comprises reactive-ion-etching the Ge in an $CHF_3$ gas.

35. The method of claim 31 further comprising removing the etch-protect layer from beneath the resist after removing the resist.

36. The method of claim 35 wherein the etch-protect layer is Ge and wherein removing the Ge from beneath the resist comprises removing the Ge with hydrogen peroxide.

37. The method of claim 23 further comprising depositing a protective film over the CMP stop layer after removing the magnetic material by CMP.

38. The method of claim 23 further comprising depositing a perfluorocarbon coating over the protective film.

39. A method for making a flexible contact magnetic transfer template comprising:
- providing a silicon substrate having first and second generally planar surfaces;
- adhering a plastic film to the first surface of the substrate;
- forming a pattern of resist on the plastic film;
- etching the plastic film through the resist pattern to form recesses in the plastic film;
- removing the resist;
- after etching the plastic film and removing the resist, depositing a chemical-mechanical-polishing (CMP) stop layer on the plastic film and into the recesses in the plastic film;
- depositing a layer of magnetic material over the CMP stop layer and into the recesses in the plastic film;
- removing the magnetic material by CMP until the CMP stop layer is reached; and
- removing the silicon substrate from the plastic film.

40. A method for making a flexible contact magnetic transfer template comprising:
- providing a silicon substrate having first and second generally planar surfaces;
- depositing a barrier layer on the first surface of the silicon substrate, the barrier layer being formed of a material resistant to a wet etchant capable of etching silicon;
- adhering a polyimide film to the barrier layer by coating the barrier layer with liquid polyimide and curing the polyimide;
- depositing a chemical-mechanical-polishing (CMP) stop layer on the polyimide film;
- forming a pattern of resist on the (CMP) stop layer;
- etching the polyimide film through the resist pattern to form recesses in the polyimide film;
- removing the resist;
- depositing a layer of magnetic material over the CMP stop layer and into the recesses in the polyimide film;
- removing the magnetic material by CMP until the CMP stop layer is reached; and
- removing the silicon substrate from the polyimide film by wet-etching the silicon substrate from its second surface until substantially all the silicon in contact with the baffier layer has been removed.

* * * * *

UNITED STATES PATENT AND TRADEMARK OFFICE
CERTIFICATE OF CORRECTION

| | | |
|---|---|---|
| PATENT NO. | : 7,160,477 B2 | Page 1 of 1 |
| APPLICATION NO. | : 11/044288 | |
| DATED | : January 9, 2007 | |
| INVENTOR(S) | : Zvonimir Z. Bandic et al. | |

It is certified that error appears in the above-identified patent and that said Letters Patent is hereby corrected as shown below:

In Claim 23 (column 8, line 30), delete "baffier" and replace with --barrier--.

In Claim 40 (column 10, line 27), delete "baffier" and replace with --barrier--.

Signed and Sealed this

Twenty-seventh Day of February, 2007

JON W. DUDAS
*Director of the United States Patent and Trademark Office*